(12) United States Patent
Ferguson

(10) Patent No.: US 9,077,534 B2
(45) Date of Patent: Jul. 7, 2015

(54) COMMUNICATIONS CIRCUIT INCLUDING A LINEAR QUADRATIC ESTIMATOR

(71) Applicant: Dennis D. Ferguson, Austin, TX (US)

(72) Inventor: Dennis D. Ferguson, Austin, TX (US)

(73) Assignee: Crossfield Technology, LLC, Austin, TX (US)

( * ) Notice: Subject to any disclaimer, the term of this patent is extended or adjusted under 35 U.S.C. 154(b) by 76 days.

(21) Appl. No.: 13/923,283

(22) Filed: Jun. 20, 2013

(65) Prior Publication Data

US 2014/0380131 A1  Dec. 25, 2014

(51) Int. Cl.
*H03M 13/00* (2006.01)
*G06F 11/00* (2006.01)
*H04L 1/20* (2006.01)
*H04L 1/00* (2006.01)

(52) U.S. Cl.
CPC *H04L 1/20* (2013.01); *H04L 1/001* (2013.01); *H04L 1/0045* (2013.01); *H04L 1/0015* (2013.01); *H04L 1/0003* (2013.01); *H04L 1/0007* (2013.01); *H04L 1/0009* (2013.01); *H04L 1/0019* (2013.01)

(58) Field of Classification Search
CPC .... H04L 1/0019; H04L 1/0001; H04L 1/0015
USPC .................................. 714/708, 774
See application file for complete search history.

(56) References Cited

U.S. PATENT DOCUMENTS

| | | |
|---|---|---|
| 5,228,058 A | 7/1993 | Ushirokawa et al. |
| 5,425,051 A | 6/1995 | Mahany |
| 6,044,485 A | 3/2000 | Dent et al. |
| 6,185,418 B1 | 2/2001 | MacLellan et al. |
| 6,236,647 B1 | 5/2001 | Amalfitano |
| 6,240,145 B1 | 5/2001 | Koizumi |
| 6,408,039 B1 | 6/2002 | Ito |
| 6,507,827 B1 | 1/2003 | Benson, Jr. |
| 6,807,227 B2 | 10/2004 | Chien |
| 7,271,737 B1 | 9/2007 | Hoffberg |
| 7,333,812 B2* | 2/2008 | Mochizuki .................... 455/442 |
| 7,756,196 B1 | 7/2010 | Despain et al. |
| 2002/0015401 A1 | 2/2002 | Subramanian et al. |
| 2002/0126044 A1* | 9/2002 | Gustafson et al. ....... 342/357.12 |
| 2003/0058927 A1* | 3/2003 | Douglas et al. .............. 375/147 |
| 2005/0058099 A1* | 3/2005 | Hernandez-Mondragon et al. ............................. 370/331 |
| 2005/0181736 A1* | 8/2005 | Cao et al. ........................ 455/69 |
| 2006/0143678 A1 | 6/2006 | Chou et al. |
| 2008/0130513 A1 | 6/2008 | Shin et al. |
| 2013/0246006 A1* | 9/2013 | Al-Mazrooei et al. ........ 702/190 |
| 2014/0281779 A1* | 9/2014 | Wellman et al. .............. 714/746 |

OTHER PUBLICATIONS

Wikipedia; Kalman Filter; Online Encyclopedia; Jun. 5, 2010; 24 Pages; Wikipedia Foundation, Inc.; San Diego, California.

(Continued)

*Primary Examiner* — Joseph D Torres
(74) *Attorney, Agent, or Firm* — Cesari & Reed LLP; R. Michael Reed

(57) ABSTRACT

A circuit includes a linear quadratic estimator (LQE) configured to receive a plurality of measurements a signal. The LQE is configured to weight the measurements based on their respective uncertainties to produce weighted averages. The circuit further includes a controller coupled to the LQE and configured to selectively adjust at least one data link parameter associated with a communication channel in response to receiving the weighted averages.

26 Claims, 4 Drawing Sheets

(56) References Cited

OTHER PUBLICATIONS

Chuan Liu; Optimizing Packet Size in Radio Transmission CS450 Project Report; Technical Report; Dec. 13, 2008; 6 Pages; Johns Hopkins University; Baltimore, Maryland.

Andrew G. Klein, C. Richard Johnson, Jr., and Pierre Duhamel; On Blind Equalization of Biorthogonal Signaling; Magazine; Apr. 2007; 15 Pages; IEEE Transactions on Signal Processing, vol. 55, No. 4; Institute of Electrical & Electronics Engineers.

Kannan Srinivasan and Philip Levis; RSSI is Under Appreciated; Article; 2006; 5 Pages; Proceedings of the Third Workshop on Embedded Networked Sensors; EmNets.

Christos Komninakis, Christina Fragouli, Ali H. Sayed, and Richard D. Wesel; Multi-Input Multi-Output Fading Channel Tracking and Equalization Using Kalman Estimation; Magazine; May 2002; 12 Pages; IEEE Transactions on Signal Processing, vol. 50, No. 5; Institute of Electrical and Electronics Engineers.

Zhiwen Zhu and Henry Leung; Adaptive Blind Equalization for Chaotic Communication Systems Using Extended-Kalman Filter; Magazine; Aug. 2001; 11 Pages; IEEE Transactions on Circuits and Systems-I: Fundamental Theory and Applications, vol. 48, No. 8; Institute of Electrical and Electronics Engineers.

Tong Liu, Paramvir Bahl, and Imrich Chlamtac; Mobility Modeling, Location Tracking, and Trajectory Prediction in Wireless ATM Networks; Journal; Aug. 1998; 15 Pages; IEEE Journal on Selected Areas in Communications, vol. 16, No. 6; Institute of Electrical and Electronics Engineers.

S. Joe Qin, and Thomas A. Badgwell; An Overview of Industrial Model Predictive Control Technology; Manuscript; 1997; 31 Pages; Department of Chemical Engineering, University of Texas at Austin; Austin, Texas.

G Wimmer; Uniformly Best Linear-Quadratic Estimator in a Special Structure of the Regression Model; Manuscript; May 18, 1992; Acta Math. Univ. Comenianae, vol. LXI, 2(1992), pp. 243-250; Mathematical Institute, Slovak Academy of Sciences, Bratislava, Czechoslovakia.

\* cited by examiner

COMMUNICATIONS CIRCUIT INCLUDING A LINEAR QUADRATIC ESTIMATOR

GOVERNMENT LICENSE RIGHTS

This invention was made with government support under DE-SC0000921 awarded by the United States Department of Energy. The government has certain rights in the invention.

FIELD

The present disclosure is generally related to adaptive filters for communication circuits, and more particularly to a circuit configured to adaptively adjust data link parameters in response to communication channel impairments.

BACKGROUND

In communication systems, a transmitter processes and converts information into electrical signals and transmits the electrical signals through a communication channel to a receiving device. The receiving device on the other end of the communications channel processes the electrical signals to recover the information.

Such communication systems can include wireless systems, such as ad hoc wireless links, wireless telephone networks, short range wireless data networks (such as IEEE 802.3x wireless networks), satellite networks, and other wireless networks, as well as wired systems, such as cable network systems, wired local area networks, public switched networks, and the like. Regardless of the type of system used, the term "communications channel" refers to a physical or logical data link for carrying electrical or electromagnetic signals between a transmitting device and a receiving device. In wireless environments and in packet-switched environments, the communication channel defines a logical connection between two devices through one or more communication networks though the data packets may travel from a source to a destination device through different paths. In wireless environments, such communication channels carry radio frequency signals, which are electromagnetic waves having a frequency within a range of a few hundred Hertz (Hz) to several megahertz.

Numerous factors influence the speed, efficiency, and reliability of data communication through the communication channel, including, but not limited to, bandwidth, error performance, congestion, noise, and other factors. The term "throughput" refers to the actual amount of useful and non-redundant information transmitted from the transmitting device to the receiving device. In portable systems, movement of either device can cause performance of the communication channel to change over time. In some instances, the communication channel becomes impaired due to multipath reflections, attenuation, or noise, which can reduce the effective throughput.

One technique developed to mitigate the impact of channel impairments includes forward error correction (FEC) coding to allow for correction of channel-induced errors at the receiving device. As errors accumulate beyond what is correctable by the FEC coding, the receiving device requests retransmission from the transmitting device, and the transmitting device resends the requested data. Such retransmissions reduce the efficiency of the communication channel

SUMMARY

In an embodiment, a circuit includes a linear quadratic estimator (LQE) configured to receive a plurality of measurements a signal. The LQE is configured to weight the measurements based on their respective uncertainties to produce weighted averages. The circuit further includes a controller coupled to the LQE and configured to selectively adjust at least one data link parameter associated with a communication channel in response to receiving the weighted averages.

In another embodiment, a circuit includes a linear quadratic estimator (LQE) configured to determine measurements and associated uncertainties corresponding to a received signal and to provide an output signal corresponding to the received signal. The circuit further includes a controller coupled to the LQE and configured to determine a state of a communication channel in response to the output signal from the LQE.

In still another embodiment, a circuit includes a linear quadratic estimator (LQE) configured to receive one or more signals and to determine measurements and associated uncertainties corresponding to the one or more signals. The LQE is configured to generate at least one output signal in response to determining the measurements and the associated uncertainties. The circuit further includes a controller coupled to the LQE and configured to selectively adjust one or more data link parameters associated with a communication channel in response to the at least one output signal.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

In general, while large-sized data packets may provide better channel efficiency than small-sized data packets in terms of channel throughput, larger sized packets may be more susceptible to errors than relatively small packets. Further, such large-sized packets may be inefficiently retransmitted when the FEC codes are unable to correct errors within the packets. As the number of retransmission requests increases, the transmitting system may reduce the packet size, isolating errors to smaller packets that can more easily be retransmitted in an attempt to preserve throughput. Unfortunately, the small-sized packets can reduce the overall efficiency of the system. Moreover, such systems may reduce the packet size to a pre-determined size, which may be smaller than necessary to achieve a desired (pre-determined) throughput. Further, depending on the source of channel impairment, packet-size adjustments alone may be insufficient to produce the desired throughput and another type of adjustment may have improved the channel throughput more effectively.

Embodiments of a circuit and method are described below that include a linear quadratic estimator (LQE) configured to receive measurements corresponding to at least one signal received from an antenna and to produce at least one output corresponding to the measurements. The circuit may further include a controller coupled to the LQE.

In one possible embodiment, the controller may be adapted to selectively adjust one or more parameters associated with a communication channel (including packet size) based on multiple signal and channel measurements. Such adjustments can be applied to signal processing components of a transceiver and may be communicated to a remote device through the communication channel (either explicitly as an adjustment signal or implicitly as a byproduct of the data communication). In an embodiment, the LQE automatically adapts the system to channel impairments by generating data link parameter adjustment signals to adjust one or more of a packet size, an error correction coding technique, a signal modulation technique, a signal strength, other channel parameters, or any combination thereof.

In another embodiment, the controller may be adapted to determine a source of channel impairment. For example, in an embodiment of the circuit that includes a connection to a polarized antenna configured to receive a signal from another polarized antenna, the controller may utilize the output of the LQE to determine one or more parameters associated with the communication channel. The controller may utilize one or more of those parameters to determine an orientation of a remote device, such as a wireless sensor, and/or to determine a weighting associated with one or more measurements based on the one or more parameters. One embodiment of a system that includes one or more LQEs is described below with respect to FIG. 1.

Figure 1:
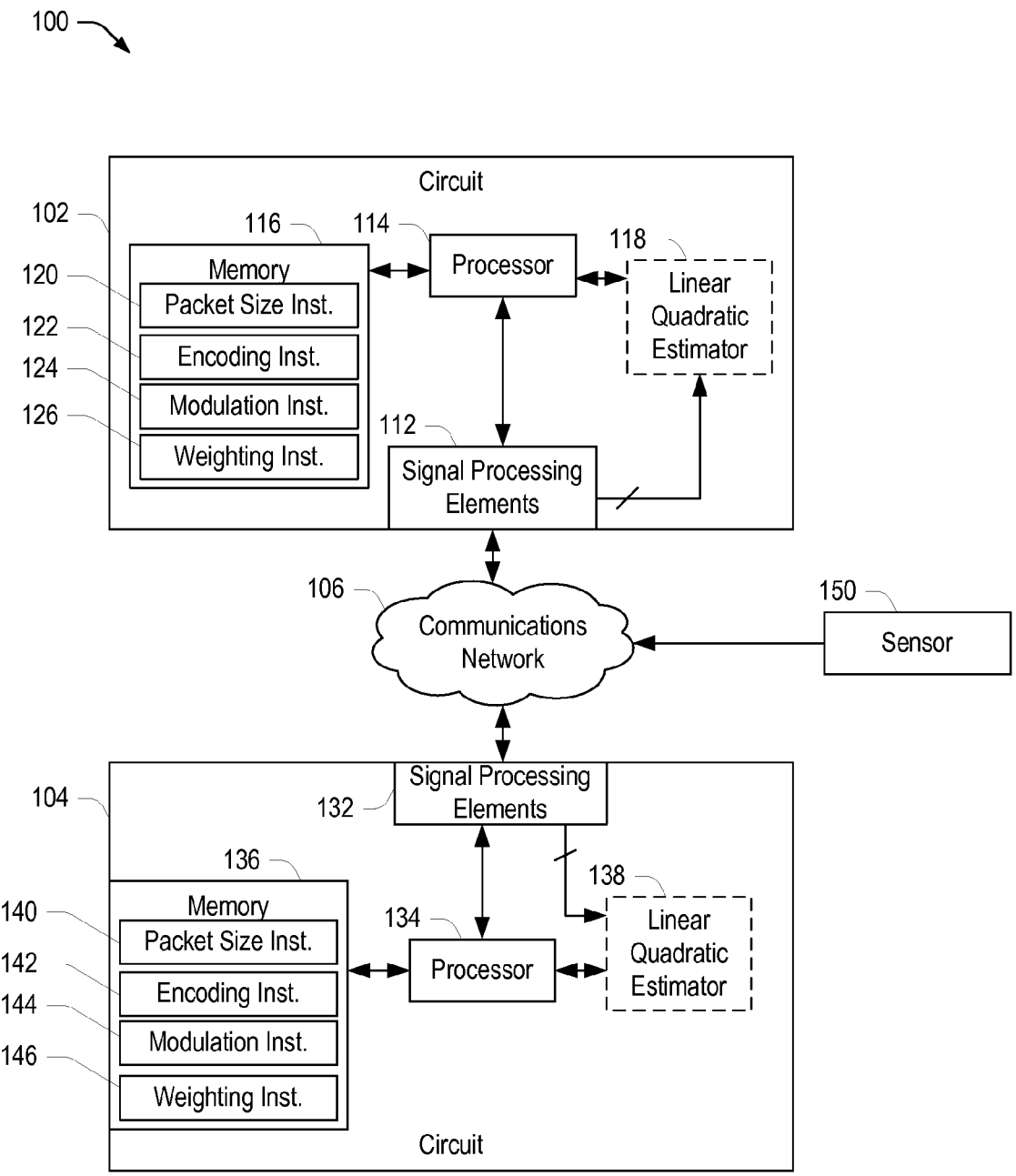
FIG. 1 is a block diagram of an embodiment of a system including a circuit with a linear quadratic estimator (LQE).

FIG. 1 is a block diagram of an embodiment of a system 100 including circuits 102 and 104 including LQEs 118 and 138, respectively, which are configured to dynamically adjust parameters associated with a communication channel. Circuits 102 and 104 are communicatively coupled through a communication channel that traverses a communications network 106, which may be a local area network, a wide area network, a public switched telephone network, a wireless communications network, or any combination thereof. Circuits 102 and 104 may be included within mobile communication devices, such as mobile telephones or portable computing systems. Alternatively, one of the circuits 102 or 104 may be associated with a base station of a wireless communication network, or a content source (such as a video on demand system, a television over Internet Protocol network, a web site, a satellite television system, or other content source). In another embodiment, circuit 102 may be associated with an industrial process control system, and circuit 104 may be associated with a sensor, such as a field device sensor.

Circuit 102 includes signal processing elements 112 coupled to communications network 106 and to processor 114. Circuit 102 may be coupled to communication network 106 through a wired connection or by an antenna through a wireless communication link, depending on the implementation. Signal processing elements 112 may include a network interface configured to couple to communications network 106 through a wired or wireless connection. The network interface may include a transceiver configured to send and receive signals through network 106. Signal processing elements 112 can include amplifiers, filters, mixers, analog-to-digital converters (ADCs) and other circuitry configured to process received signals into a form suitable for processing by processor 114. Circuit 102 further includes LQE 118 coupled to signal processing elements 112 and to processor 114. LQE 118 is depicted in phantom because LQE 118 may be implemented as a function executed by processor 114 or as a separate component (such as a field programmable gate array), depending on the particular implementation.

Additionally, circuit 102 includes a memory 116 coupled to processor 114. Memory 116 includes instructions executable by processor 114 for adjusting data link parameters to achieve a desired throughput. Memory 116 includes packet size instructions 120 executable by processor 114 to adjust a packet size of packets used to transmit data through communications network 106. Memory 116 also includes encoding instructions 122 executable by processor 114 to adjust a data encoding parameter, such as a type of error correction coding, a number of parity bits, or other encoding parameters. Further, memory 116 includes modulation instructions 124 executable by processor 114 to adjust a signal modulation parameter for communication of data through communications network 106, such as quadrature amplitude modulation, phase-shift keying, frequency division multiplexing, or other modulation schemes. Further, the signal modulation parameter can include extending orthogonal frequency-division multiplexing (OFDM) techniques over different channels, changing modulation techniques, changing frequencies, or any combination thereof. Additionally, memory 116 includes weighting instructions 126 that, when executed by processor 114, causes processor 114 to weight a measurement from a measurement sensor based on the data link parameters.

Circuit 104 includes signal processing elements 132 coupled to communications network 106 and to processor 134. Circuit 104 may be coupled to communication network 106 through a wired connection or by an antenna through a wireless communication link, depending on the implementation. Signal processing elements 132 may include a network interface configured to couple to communications network 106 through a wired or wireless connection. The network interface may include a transceiver configured to send and receive signals through network 106. As with signal processing elements 112, signal processing elements 132 can include amplifiers, filters, mixers, analog-to-digital converters (ADCs) and other circuitry configured to process received signals into a form suitable for processing by processor 134. Circuit 104 further includes a LQE 138 coupled to signal processing elements 132 and to processor 134. LQE 138 is depicted in phantom because LQE 138 may be implemented as a function executed by processor 134 or as a separate component, depending on the particular implementation.

Further, circuit 104 includes a memory coupled to processor 134. Memory 136 includes instructions executable by processor 134 for adjusting data link parameters to achieve a desired throughput. Memory 136 includes packet size instructions 140 executable by processor 134 to dynamically adjust a packet size of packets used to transmit data through communications network 106. In a particular example, processor 134 may execute packet size instructions 140 to variably adjust the packet size to achieve a selected throughput. In an example, processor 134 may execute a first packet size adjustment to reduce the packet size from a first packet size to a second packet size. Processor 134 may execute a second packet size adjustment to reduce the packet size from the second packet size to a third packet size. If transmission throughput is lower after the second packet size adjustment, processor 134 may increase the packet size to the second packet size or to another packet size that is between the second packet size and the third packet size to enhance throughput. Memory 136 also includes encoding instructions 142 executable by processor 134 to adjust a data encoding parameter. Further, memory 136 includes modulation instructions 144 executable by processor 134 to adjust signal modulation parameters for communication of data through communications network 106. Additionally, memory 136 includes weighting instructions 146 that, when executed by processor 134, causes processor 134 to weight a measurement from a measurement sensor based on the data link parameters.

System 100 further includes a sensor 150, which may include communications circuitry configured to communicate with at least one of circuits 102 and 104 through network 106 send and/or receive data. In an example, sensor 150 may include a directional antenna or polarized antenna. In an embodiment, sensor 150 may move and/or change orientation relative to circuit 102, and circuit 102 may be configured to determine one or more channel parameters, to weight a measurement value from sensor 150 based on the one or more channel measurements and to generate one or more control signals based on the weighted measurement value. In an example, a system receives multiple measurement values from a plurality of sensors and weights the measurements in order to determine a state of a system. The system may receive a measurement from a wireless sensor, which may communicate with the system through a wireless communication path, and the measurement may be weighted based on the channel impairments.

In general, LQEs 118 and 138 may be implemented as filters that use a mathematical approach to changing the packet size and that have the added benefit that a model of the channel is not required to generate an optimal response. The LQEs 118 and 138 can be used to optimize the signal to adapt to channel impairments and change multiple data link parameters including packet size, error correction coding, or other channel parameter.

In an embodiment, the LQE filter takes multiple radio inputs such as bit error rate (BER), signal level (RSSI), or some other measurable feature of the radio link and generates an optimum response in a minimum least square error sense (the sum of the square of the errors is minimized). The LQE filter response can then be used optimize the radio data link performance by varying data link parameters such as packet size, error correction coding technique, signal strength, and/or other parameters.

In the following discussion, a process is described with respect to circuit 104 for adjusting data link parameters associated with transmission of data through a communication channel, which is a logical data link through communications network 106. However, it should be appreciated that either circuit 102 or 104 (or both circuits) can adjust data link parameters in the same or a similar manner.

In operation, LQE 138 detects a channel impairment in response measurement data, such as a received signal strength indicator (RSSI), a bit error rate (BER), a number of packet retransmission requests, a number of symbol errors, other measurement data, or any combination thereof. Upon detection of the channel impairment, LQE 138 generates a data link parameter adjustment signal that may be provided to processor 134, which processes the data link parameter adjustment signal in conjunction with packet size instructions 140, encoding instructions 142, and modulation instructions 144 to vary one or more of the data link parameters to adjust at least one of a packet size, an error correction coding technique, a signal modulation technique, other data link parameters, or any combination thereof. Further, processor 134 may communicate the data link parameter adjustment signal (or data related thereto) to circuit 102 through the communications channel via a transmitter (which may be part of signal processing elements 112). In an embodiment, signal processing elements 112 includes a transceiver configured to send and receive signals through a communication channel. In a particular embodiment, processor 134 is configured to determine a source of the channel impairment and adjust multiple data link parameters in response to the data link parameter adjustment signal to achieve a desired throughput, despite the channel impairment.

In one embodiment, processor 134 dynamically reduces a packet size parameter in response to estimating the source of impairment to be one of thermal noise, fading, white noise, and burst noise. In another embodiment, processor 134 adjusts an error correction coding parameter in response to a high bit error rate, for example, by configuring the communication channel to change from a first error correction coding scheme to a second error correction coding scheme. In still another embodiment, processor 134 alters a signal modulation parameter from a first signal modulation scheme to a second signal modulation scheme in response to receiving the weighted averages.

It should be understood that circuits 102 and 104 may be incorporated within electronic devices, such as a smart phone, a portable computer, or other computing device configured to communicate with other devices through communication channels. Circuits 102 and 104 allow such devices to communicate with one another in spite of various channel impairments by dynamically adjusting one or more parameters to facilitate reception and/or transmission of data through the communication channel.

While the block diagram in FIG. 1 depicts a simplified representation of system 100, LQEs 118 and 138 are configured to receive multiple inputs, including inputs from multiple components or portions of signal processing elements 112 and 132 and optionally one or more inputs from a digital signal processor, such as processors 114 and 134. A more detailed example of one possible implementation of signal processing elements 112 and 132 is described below with respect to FIG. 2.

Figure 2:
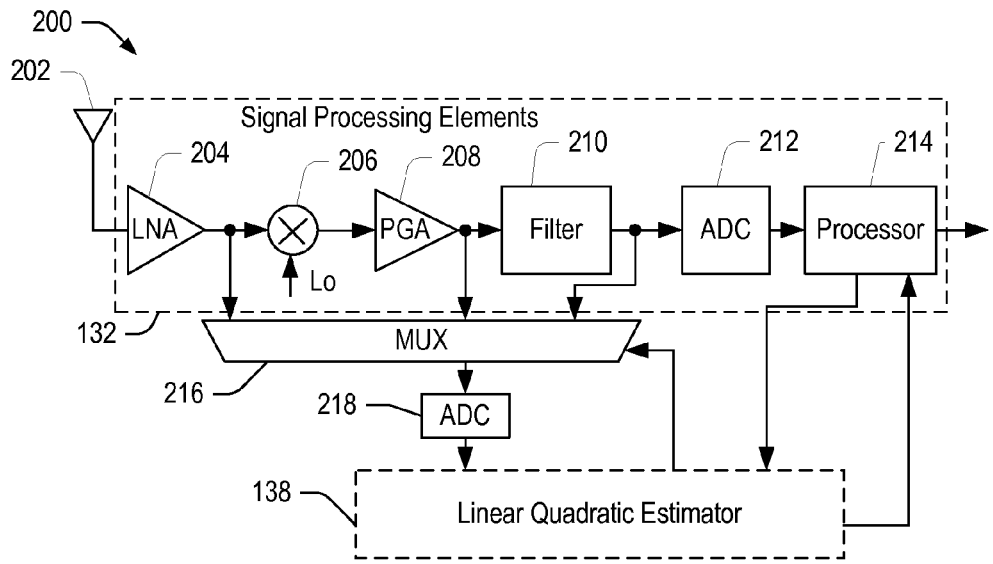
FIG. 2 is a block diagram of a system including a detailed example of signal processing elements of one possible embodiment of the circuit depicted in FIG. 1.

FIG. 2 is a block diagram of an embodiment of a system 200 including a detailed example of signal processing elements 132 illustrating one possible embodiment of a portion of circuit 104 depicted in FIG. 1. System 200 includes an antenna 202 coupled to signal processing elements 132 and adapted to receive radio frequency signals. Further, system 200 includes a multiplexer (MUX) 216 with multiple data inputs coupled to links between various signal components, a select input coupled to LQE 138, and an output coupled to an input of an analog-to-digital converter (ADC) 218. ADC 218 further includes an output coupled to LQE 138 for providing selected measurement data. In some instances, additionally circuitry may be included in front of the inputs to the MUX 216 to amplify or otherwise adjust one or more of the signals.

Signal processing elements 132 include a low noise amplifier 204 having an input coupled to antenna 202 and an output coupled to an input of MUX 216 and to an input of a mixer 206, which includes a second input for receiving a local oscillator signal (Lo) and an output. Signal processing elements 132 further include a programmable gain amplifier (PGA) 208 including an input coupled to the output of mixer 206 and an output coupled to an input of MUX 216 and to an input of a filter 210. Filter 210 includes an output coupled to an input of MUX 216 and to an analog-to-digital converter 212. Analog-to-digital converter 212 includes an output coupled to an input of a processor 214, which includes a second input coupled to LQE 138, a first output coupled to LQE 138, and a second output. The second output of processor 214 may be coupled to a processor (such as processor 134 in FIG. 1), a controller (such as controller 312 in FIG. 3), or another circuit. Processor 214 may be a local processor, a processing core, a state machine, or any combination thereof.

In operation, antenna 202 receives a radio frequency signal and provides it to LNA 204. LNA 204 amplifies the signal to produce a first intermediate signal that is provided to a mixer 206, which mixes the intermediate signal with a local oscillator signal (Lo) to down-covert the radio frequency to an intermediate frequency to produce a second intermediate signal. PGA 208 scales the second intermediate signal to produce a third intermediate signal. Filter 210 processes the third intermediate signal to produce a fourth intermediate signal. ADC 212 digitizes the fourth intermediate signal to produce a digital version of the fourth intermediate signal and provides the digital version to processor 214.

LQE 138 controls MUX 216 to selectively provide one of the inputs to ADC 218 and receives a resulting signal from a selected one of multiple points between the signal processing elements 132. LQE 138 also receives other inputs from processor 214 or from other values derived from the various points between the signal processing elements 132. Such other inputs can include a bit error rate (BER), a received signal strength indicator (RSSI), a signal quality metric, or some other measurable feature of the data link and/or of the signal.

In response to one or more of the measurements and other inputs, LQE 138 generates a data link adjustment signal. In particular, LQE 138 predicts values for the channel and the signal, estimates the uncertainties of the measured values, and computes weighted averages of the predicted values and the measured values. In an embodiment, LQE 138 gives the most weight to a measured value with a least uncertainty. LQE 138 calculates the weights from the covariance, a measure of the estimated uncertainty of the prediction of the system's state. The weighted averages represent new state estimates that lie in between the predicted and measured states, and have better estimated uncertainties than either the predicted or the measured states.

LQE 138 processes multiple measurements and predicted values at each time step, with the new estimate and its covariance informing the prediction in the next iteration. Thus, LQE 138 operates as a Kalman filter, processing data points recursively and based on only the last estimation, and not the entire history, of a system's state to calculate a new state. When performing the actual calculations for the filter (as discussed below), LQE 138 may code the state estimate and covariances into matrices to handle the multiple dimensions involved in a single set of calculations. This allows for representation of relationships between different state variables, such as RSSI, bit error rate, signal-to-noise ratio (SNR), dynamic range, signal quality metrics, and other measurable parameters, in any transition models or covariances.

LQE 138 estimates the internal state of data communication channel given a sequence of noisy observations and is adapted to determine the state of the system with respect to the received signal. In an embodiment where a model of the process is used, LQE 138 may utilize a state space model to represent the process, which state space model is defined by the following matrices: the state-transition model ($F_k$); the observation model ($H_k$); the covariance of the process noise ($Q_k$); the covariance of the observation noise ($R_k$); and sometimes the control-input model ($B_k$), for each time-step (k). In an example, LQE 138 predicts the state (x) of the system at a point in time (k). Generally, the state estimate ($\hat{x}_{k|k}$) represents an a posteriori state estimate ($\hat{x}$) at time (k) given observations up to and including time (k). LQE 138 determines a predicted state estimate ($\hat{x}_{k|k-1}$) at time (k) given observations up to an including the previous time (k−1) according to the following equation:

$$\hat{x}_{k|k-1} = F_k \hat{x}_{k-1|k-1} + B_k u_k + w_k \quad (1)$$

In Equation 1, LQE 138 determines the predicted (a priori) state estimate by mapping the estimated state ($\hat{x}_{k-1|k-1}$) up to and including time (k−1) to the predicted state space using state-transition model ($F_k$), adds a control vector ($u_k$) mapped to control-input model ($B_k$), and adds process noise ($w_k$), which process noise can be assumed to be drawn from a zero mean multivariate normal distribution with covariance ($Q_k$).

LQE 138 determines a predicted (a priori) covariance ($\hat{Q}_{k|k-1}$) representing the estimated accuracy of the state estimate according to the following equation:

$$P_{k|k} = \text{cov}(Q_k - \hat{Q}_{k|k}) \quad (2)$$

LQE 138 then generates the measurement values representing the observed state (z) of the system at the point in time (k) according to the following equation:

$$z_k = H_k x_k + v_k \quad (3)$$

In Equation 2, the observation model ($H_k$) maps the state space ($x_k$) into the observed space with observation noise ($v_k$). In some embodiments, the observation noise is assumed to be a zero mean Gaussian white noise with a covariance ($R_k$). For each of the above equations 1-3, the initial state (x) and the noise (v) vectors at each step can be assumed to be mutually independent. The observation noise and the observation model introduce a level of uncertainty into the observed state ($z_K$), which uncertainty determines a relative weight ascribed to a particular observation.

Once calculated, LQE 138 averages the observed state ($z_k$) and the estimated state ($\hat{x}_{k|k-}1$) to determine a weighted average, which can be used by processor 134 in FIG. 1 or by processor 214 in FIG. 2 to adjust one or more data link parameters associated with the communication channel. Further, LQE 138 determines weighted averages for the multiple observations (measurements).

Within LQE 138, the prediction phase uses the state estimate ($\hat{x}_{k|k-1}$) from time (k−1) to produce an estimate of the state at the time (k). This predicted state estimate is sometimes referred to as the a priori state estimate because, though it is a prediction of the state at time (k), it does not include observation information from time (k). In the update phase, LQE 138 combines the predicted state estimate with current observation information to refine the state estimate. The improved estimate is sometimes referred to as an a posteriori state estimate.

In an example where no model of the process is provided, LQE 138 receives measurement data from multiple signal processing elements and determines an adjustment to substantially minimize a sum of the square of the errors to provide a minimum least square error (MLSE) by adjusting the system in response to the measurement data. LQE 138 produces a data link adjustment signal (or control signal) that may improve the performance of the data link by varying one or more data link parameters, such as packet size, error correction coding technique, signal strength, modulation technique, other parameters or any combination thereof.

In the illustrated embodiment, processor 214 may include one or more processor cores and may be configured to determine the adjustment. In an alternative embodiment, processor 214 could be replaced with other programmable logic circuitry configured to generate various signal quality metrics and to control data link parameters in response to an output of LQE. In another alternative embodiment, processor 214 maybe omitted and any functional role provided by processor 214 could be replaced by processor 114 or 134 in FIG. 1.

While the above-described embodiments in FIGS. 1 and 2 depict LQE as a simplified block, LQEs 118 and 138 can include one or more modules configured to generate the data link adjustment signal. An example of one possible implementation of a LQE is described below with respect to FIG. 3.

Figure 3:
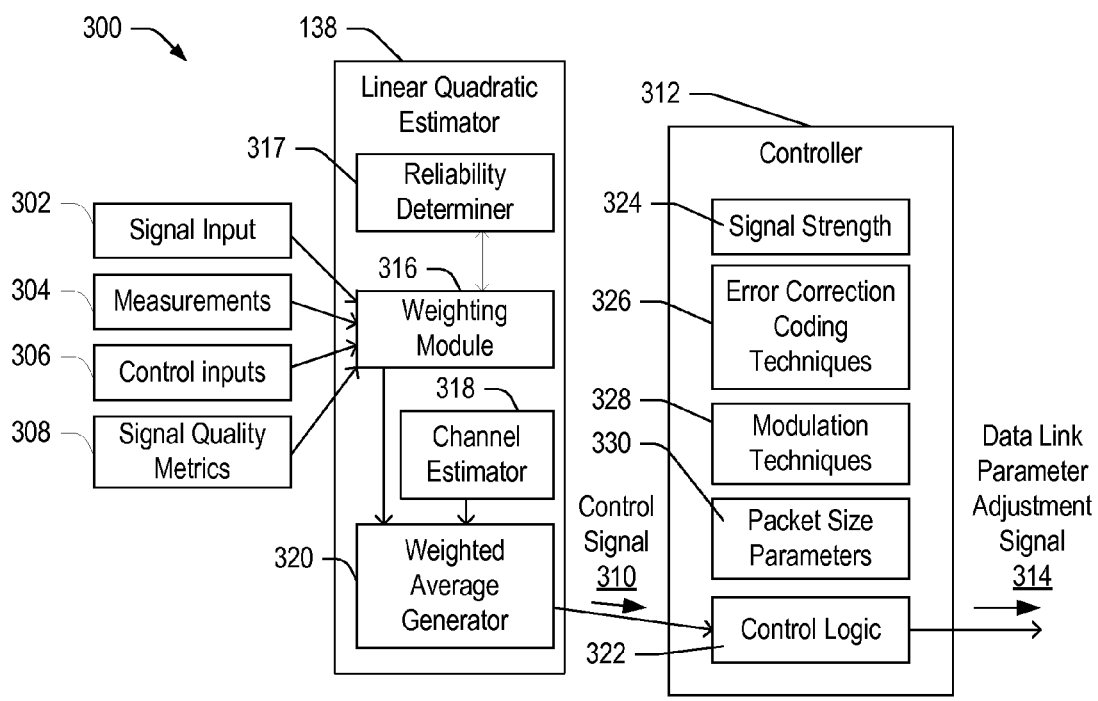
FIG. 3 is a conceptual block diagram of a portion of the LQE of FIG. 1.

FIG. 3 is a conceptual block diagram of a portion 300 of either circuit 102 or 104 of the system 100 of FIG. 1 configured to generate a data link parameter adjustment signal to adjust parameters associated with the communication channel. Portion 300 includes LQE 138 and a controller 312. LQE 138 includes a weighting module 316, a reliability determiner 317, a channel estimator 318, and a weighted average generator 320. Controller 312 includes control logic 322, which is configured to adjust various parameters according to respective instructions, such as signal strength 324, error correction coding techniques 326, modulation techniques 328, and packet size parameters 330.

LQE 138 receives signal inputs 302 (such as digital data representing a received input signal), measurements 304 (such as digital inputs from ADC 218 in FIG. 2), control inputs 306 from processor 214 in FIG. 2, and various signal quality metrics 308 from processor 214 in FIG. 2. LQE 138 may receive one or more of such inputs at weighting module 316 from a multiplexer (not shown), such as MUX 216 in FIG. 2. Weighting module 316 applies a respective weight to each input according to its associated uncertainty. The uncertainty may be a due to signal noise, observation noise, and/or other factors. Weighting module 316 includes an input/output (I/O) coupled to a reliability determiner 317, which determines a reliability for each measurement based, for example, on one or more data link parameters of the communication channel. Weighting module 316 further includes an output coupled to an input of a weighted average generator 320, which has a second input coupled to an output of a channel estimator 318. Channel estimator 318 generates the prediction of the state of the channel and provides the prediction to weighted average generator 320. Weighted average generator 320 includes an output coupled to an input of control logic 322 within controller 312 and provides a control signal 310 to the output. In some instances, control signal 310 represents a vector indicating a weighted state of the system.

Control logic 322 receives control signal 310. In response to receiving control signal 310, in an embodiment, control logic 322 determines a likely or probable source of channel impairment and adjusts at least one of the signal strength 324, error coding techniques 326, modulation techniques 328, and packet size parameters 330 to produce a data link parameter adjustment signal 314 in response to determining the source. In a particular embodiment, the adjustment is made to enhance throughput. In another embodiment, the adjustment is made to reduce data errors.

In an embodiment, LQE 138, controller 312, control signal 310, and data link parameter adjustment signal 314 may be internal to a digital signal processor, such as processors 114 and 134 in FIG. 1 or processor 214 in FIG. 2. In such an embodiment, LQE 138 and the controller 312 may be implemented as processor-readable instructions that are executable by a processor to vary multiple data link parameters associated with a communication channel in response to one or more of the signal input 302, measurements 304, control inputs 306, and signal quality metrics 308 indicating channel impairment.

In an alternative example, radio link quality can be used as a mechanism to improve the quality of a wireless sensor-based control solution. While digital data links may have good quality until they are close to failure (where the wireless sensor signal may decrease rapidly to zero data), a carrier-based sensor, such as the U.S. Army Armament Research, Development and Engineering Center (ARDEC) orientation sensor, relies on polarization of the antenna. In one example, a vertically polarized transmit antenna provides a maximum signal to a corresponding vertically polarized receive sensor. However, as the receive sensor rotates with respect to the transmitted reference signal, the receive signal is attenuated. At 90 degrees cross polarization, the receive signal may be attenuated by as much as 20-30 dB. This attenuation may be used as a measure of the sensor's orientation. Alternatively, the attenuation may be used as a metric of the measurements reliability. In either case, the attenuation may be used to weight measurements, and the weighted measurements may be used as part of a control solution.

In another embodiment, controller may be a linear quadratic regulator configurable to generate the data link parameter adjustment signal 314. Regardless of the specific implementation, an example of one possible embodiment of a method of varying multiple data link parameters is described below with respect to FIG. 4.

Figure 4:
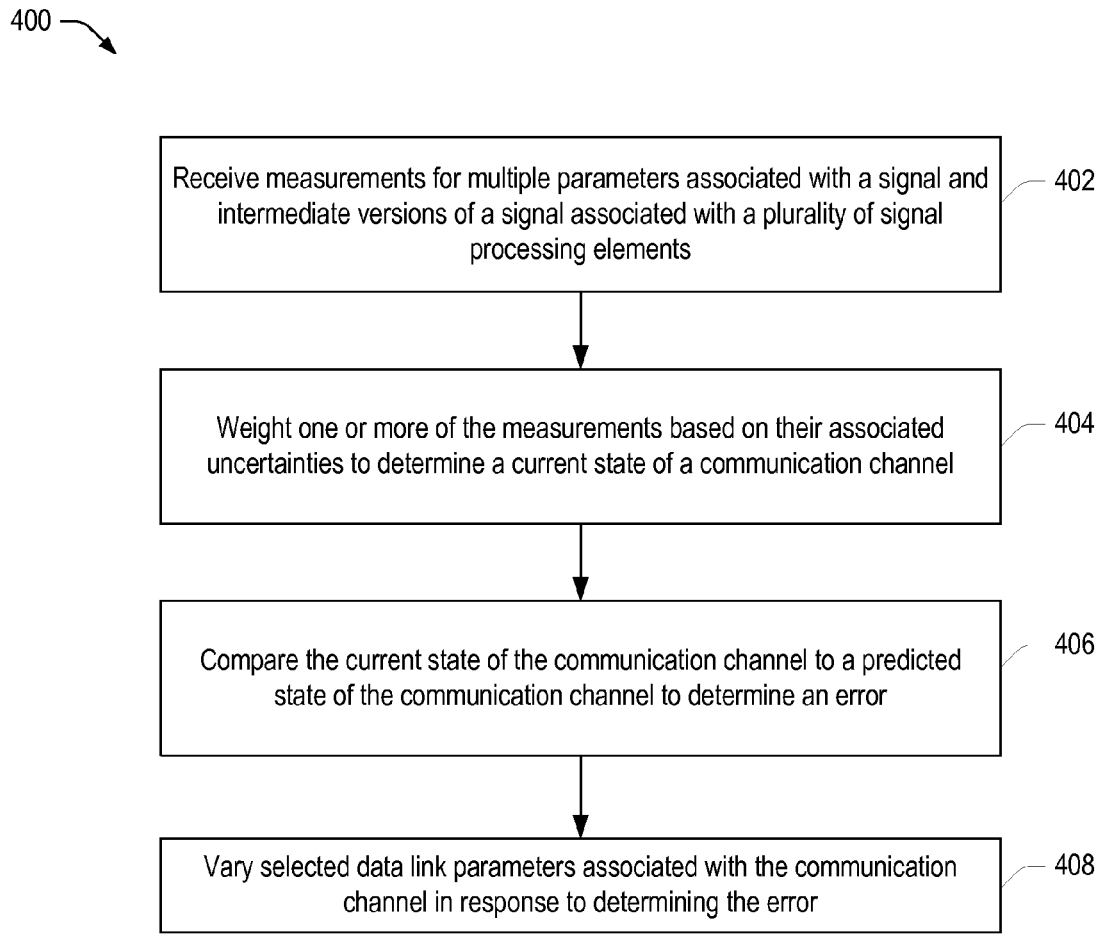
FIG. 4 is a flow diagram of an embodiment of a method of varying multiple data link parameters associated with a communication channel using the system of FIG. 1.

FIG. 4 is a flow diagram of an embodiment of a method 400 of varying multiple data link parameters associated with the communication channel using the system of FIG. 1. At 402, LQE 138 receives measurements for multiple parameters associated with a signal and intermediate versions of a signal associated with a plurality of signal processing elements. LQE 138 may receive the measurements from a first portion and from a second portion of multiple signal processing elements 132. In one embodiment, the first portion and the second portion represent sequential components, such as PGA 208 and filter 210 in the signal processing sequence, such as nodes within a front end of a receiver circuit. In another embodiment, the first and second portions may be separated by intervening components, such as LNA 204 and filter 210, for example.

Advancing to 404, LQE 138 weights one or more of the measurements based on their associated uncertainties to determine a current state of a communication channel. Each measurement has an associated uncertainty, which uncertainty determines a relative weight of the measurements. More certain measurements are weighted more than those with greater uncertainty. Such uncertainty may be due to observation noise or other factors.

Moving to 406, LQE 138 compares the current state of the communication channel to a predicted state of the communication channel to determine an error. The error may be determined, for example, based on a weighted average between the predicted state and the weighted measurement values. In particular, the weighted average may be subtracted from a predicted value to determine the error.

Continuing to 408, LQE 138 cooperates with a processor, such as processor 114 or 134 in FIG. 1 of processor 214 in FIG. 2, or with a controller, such as controller 312 in FIG. 3, to vary multiple data link parameters associated with the communication channel in response to determining the error. The data link parameters can include, for example, dynamically adjusting the packet size, altering the forward error correction coding (FEC), adjusting a bit error rate, adjusting signal strength, changing transmission frequencies, and so on.

It should be understood by workers skilled in the art that the signal processing circuitry represented by signal processing elements 132 may include a transmission signal path in addition to the receive signal path described in FIG. 2 to provide bi-directional communications. In a particular embodiment, the controller controls both transmit and receive paths and may communicate the parameter adjustment information to a second device through the communication channel to facilitate communication.

Alternatively, processor 214 or controller 312 may utilize the error to determine, for example, an orientation of a polarized (directional) antenna. The signal strength of a signal received by the polarized antenna may be used to determine an orientation of a transmitting sensor, and the information may be used by a control system to make adjustments in a dynamic feedback system, such as an industrial process control system. One possible example of a method of generating based on a determined state of the transmitting device is described below with respect to FIG. 5.

Figure 5:
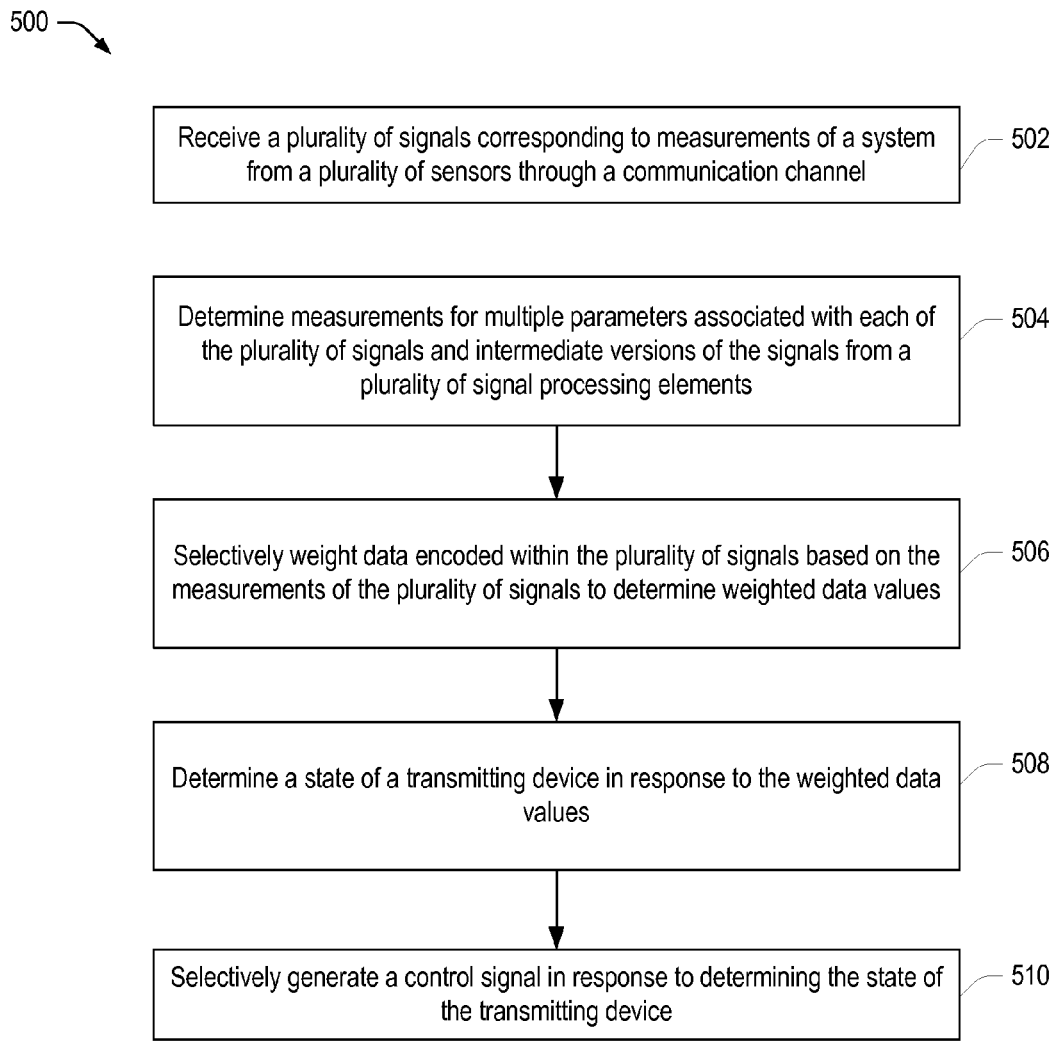
FIG. 5 is a flow diagram of a method of measuring multiple data link parameters to weight a plurality of state variables associated with a sensing device.

FIG. 5 is a flow diagram of a method 500 of measuring multiple data link parameters to weight a plurality of state variables associated with a sensing device. At 502, a plurality of signals corresponding to measurements of a system is received from a plurality of sensors through a communication channel (or multiple communication channels). Continuing to 504, measurements for multiple parameters are determined that are associated with each of the plurality of signals and intermediate versions of the signals from a plurality of signal processing elements.

Advancing to 506, data encoded within the plurality of signals are selectively weighted based on the measurements of the plurality of signals to determine weighted data values. The weighting may be based on various data link parameters, such as bit error rate (BER), received signal strength indicator (RSSI), and/or other data link parameters. Continuing to 508, a state of a transmitting device is determined in response with the weighted data values. Proceeding to 510, a control signal is selectively generated in response to determining the state of the transmitting device.

In conjunction with the systems, circuits, and methods described above with respect to FIGS. 1-5, a LQE receives multiple inputs related to intermediate signals from various signal processing elements and determines the relative weight of the multiple inputs. In an example, the LQE may be configured to generate a data link parameter adjustment signal. A control circuit, such as a processor, can use the data link parameter adjustment signal to vary one or more data link parameters. In particular, the control circuit adjusts at least one of packet size, signal modulation, error correction coding, and signal strength in response to the data link parameter adjustment signal. In another example, the LQE may utilize the one or more weights to determine a parameter of a system being monitored, such as orientation of a sensor. The control circuit may generate a control signal to control a parameter of a system, such as an industrial process, in response to determining the parameter.

Although the present invention has been described with reference to preferred embodiments, and although numerous characteristics and advantages of various embodiments of the invention have been set forth in the above description together with details of the structure and function of various embodiments of the invention, it should be appreciated that this disclosure is illustrative only and that changes may be made in detail, especially in matters of structure and arrangement of parts, without departing from the scope of the present invention. For example, LQE 138 may be implemented within a digital signal processor or as a separate logic circuit. Further, LQE 138 may be implemented without modeling the channel. Additionally, LQE 138 can be used to improve data transmission by varying data link parameters such as packet size, error correction coding technique, modulation techniques, or other channel parameters to achieve a desired throughput.

Thus, the present disclosure encompasses the above-described embodiments, as well as changes in the structure, the arrangement of parts, and other aspects within the principles of the present disclosure, at least to the full extent indicated by the broad general meaning of the terms in which the appended claims are expressed.

What is claimed is:

1. A circuit comprising:
   a linear quadratic estimator (LQE) configured to receive a plurality of measurements, the LQE configured to weight the measurements based on their respective uncertainties to produce weighted averages; and
   a controller coupled to the LQE and configured to selectively adjust at least one data link parameter associated with a communication channel in response to receiving the weighted averages.

2. The circuit of claim 1, wherein the at least one data link parameter includes at least one of an error correction coding parameter, a symbol encoding parameter, a modulation parameter, and a signal strength parameter.

3. The circuit of claim 1, wherein the controller is configured to determine a source of impairment of the communication channel in response to receiving the weighted averages.

4. The circuit of claim 3, wherein the controller reduces a packet size parameter when the source of impairment includes at least one of thermal noise, fading, white noise, and burst noise.

5. The circuit of claim 3, wherein the controller adjusts an error correction coding parameter when the source of impairment includes a high bit error rate.

6. The circuit of claim 5, wherein the controller adjusts the error correction coding parameter by configuring the communication channel to change from a first error correction coding scheme to a second error correction coding scheme.

7. The circuit of claim 1, wherein the controller alters at least one of a symbol encoding parameter and a signal modulation parameter in response to receiving the weighted averages.

8. The circuit of claim 7, wherein the controller changes the signal modulation parameter from a first signal modulation scheme to a second signal modulation scheme.

9. The circuit of claim 8, wherein the signal modulation parameter defines an orthogonal frequency-division multiplexing (OFDM) parameter; and
   wherein the controller alters the signal modulation parameter by extending the OFDM parameter over different channels.

10. The circuit of claim 1, wherein the LQE comprises a Kalman filter.

11. The circuit of claim 1, wherein:
    the LQE is configured to generate at least one output signal in response to determining the measurements and the respective uncertainties; and
    a controller coupled to the LQE and configured to selectively adjust one or more data link parameters associated with a communication channel in response to the at least one output signal.

12. The circuit of claim 1, wherein:
    the LQE is configured to provide the output signal corresponding to the received signal; and
    the controller is configured to determine a state of a communication channel in response to the output signal from the LQE.

13. A circuit comprising:
    a linear quadratic estimator (LQE) configured to receive a signal, to determine measurements and associated uncertainties corresponding to the received signal, and to weight the measurements based on the associated uncertainties to produce weighted averages, the LQE to provide an output signal including the weighted averages; and a controller coupled to the LQE and configured to determine a state of a communication channel in response to the output signal from the LQE, the LQE configured to selectively adjust at least one data link parameter associated with the communication channel in response to receiving the weighted averages.

14. The circuit of claim 13, wherein the controller is further configured to determine an orientation of an external sensor in response to the output signal.

15. The circuit of claim 14, wherein the controller selectively provides a control signal to a control a process in response to determining the orientation.

16. The circuit of claim 13, wherein the LQE weights the measurements according to the associated uncertainties to produce weighted measurements and averages the weighted measurements with predicted values to produce weighted averages.

17. The circuit of claim 16, wherein the controller determines a source of a channel impairment in response to the weighted averages and generates the output signal indicating the source of the channel impairment.

18. The circuit of claim 13, wherein:
the LQE is configured to weight the measurements based on the associated uncertainties to produce the weighted averages; and
the controller is configured to selectively adjust the at least one data link parameter associated with the communication channel in response to receiving the weighted averages.

19. The circuit of claim 13, wherein:
the LQE is configured to generate the output signal in response to determining the measurements and the associated uncertainties; and
the controller is configured to selectively adjust the at least one data link parameter associated with a communication channel in response to the at least one output signal.

20. A circuit comprising:
a linear quadratic estimator (LQE) configured to receive one or more signals and to determine measurements and associated uncertainties corresponding to the one or more signals, the LQE configured to weight the measurements based on their associated uncertainties to produce weighted averages and to generate at least one output signal including the weighted averages in response to determining the measurements and the associated uncertainties; and
a controller coupled to the LQE and configured to selectively adjust one or more data link parameters associated with a communication channel in response to the at least one output signal.

21. The circuit of claim 20, wherein the controller selectively adjusts the one or more data link parameters by increasing a number of parity bits encoded within each data packet of a plurality of data packets for error correction coding and by communicating the adjustment signal to a second circuit through a communication channel.

22. The circuit of claim 20, wherein the one or more data link parameters comprise at least two of a packet size parameter, a symbol encoding parameter, an error correction coding parameter, a modulation technique parameter, and a signal strength parameter.

23. The circuit of claim 20, wherein:
the LQE calculates errors between predicted values and the measurements and multiplies the errors by themselves to produce square errors; and
wherein the LQE and the controller cooperate to reduce a sum of the square errors.

24. The circuit of claim 22, wherein the LQE includes a plurality of inputs coupled to a plurality of nodes disposed between a plurality of signal processing elements including at least one of an amplifier, an analog-to-digital converter, and a filter.

25. The circuit of claim 20, wherein:
the LQE is configured to provide the output signal including data corresponding to the received signal; and
the controller is configured to determine a state of a communication channel in response to the output signal from the LQE.

26. The circuit of claim 20, wherein:
the LQE is configured to weight the measurements based on their respective uncertainties to produce weighted averages; and
the controller is configured to selectively adjust at least one of the one or more data link parameters associated with the communication channel in response to receiving the weighted averages.

* * * * *